United States Patent
Waltz et al.

(10) Patent No.: US 7,246,925 B2
(45) Date of Patent: Jul. 24, 2007

(54) LIGHT MODIFIER AND LAMP ASSEMBLY

(75) Inventors: Thomas A. Waltz, Manitou Beach, MI (US); Kelly Mondora, Perrysburg, OH (US)

(73) Assignee: The F.J. Westcott Co., Toledo, OH (US)

( * ) Notice: Subject to any disclaimer, the term of this patent is extended or adjusted under 35 U.S.C. 154(b) by 0 days.

(21) Appl. No.: 11/374,519

(22) Filed: Mar. 13, 2006

(65) Prior Publication Data

US 2006/0203491 A1    Sep. 14, 2006

Related U.S. Application Data

(60) Provisional application No. 60/661,741, filed on Mar. 14, 2005.

(51) Int. Cl.
*F21V 1/00* (2006.01)
*F21W 131/40* (2006.01)

(52) U.S. Cl. .......................... 362/355; 362/11; 362/16; 362/18; 362/269; 362/319

(58) Field of Classification Search .................... 362/3, 362/7, 11, 16, 18, 247, 269, 271, 319, 320, 362/343, 351, 355, 360, 371, 372

See application file for complete search history.

(56) References Cited

U.S. PATENT DOCUMENTS

| | | | |
|---|---|---|---|
| 4,633,374 A | 12/1986 | Waltz | |
| 4,757,425 A | 7/1988 | Waltz | |
| 5,841,146 A * | 11/1998 | Briese | 250/493.1 |
| 6,152,583 A * | 11/2000 | Langner | 362/427 |
| 6,176,598 B1 * | 1/2001 | Seligman et al. | 362/352 |
| 6,513,955 B1 | 2/2003 | Waltz | |
| 6,808,295 B2 | 10/2004 | Waltz | |

* cited by examiner

*Primary Examiner*—Laura Tso
(74) *Attorney, Agent, or Firm*—Emch, Schaffer, Schaub & Porcello., Co., L.P.A.

(57) ABSTRACT

This light modifier assembly is a continuous light source for still and video imagemakers. More specifically, the continuous light source provides a constant light source for still, digital, video or high definition image capture. In a preferred embodiment, the light source comprises a multiplicity of lamps with a control configured to run multiple combinations of lamps together with no shift in color temperature and to set up multiple lighting ratios.

12 Claims, 10 Drawing Sheets

LIGHT MODIFIER AND LAMP ASSEMBLY

This application claims the benefit of U.S. provisional patent application Ser. No. 60/661,741, filed Mar. 14, 2005.

FIELD OF THE INVENTION

This invention relates to a continuous light source for still and video imagemakers. More specifically, the continuous light source provides a constant light source for still, digital, video or high definition image capture.

BACKGROUND OF THE INVENTION

Diffused or indirect lighting is used by imagemakers in both still and motion picture type photography. To achieve an indirect, soft type lighting effect it is desirable to first either directly or indirectly pass the light through a semi-transparent material to break up and diffuse the light rays. Such lighting is generally produced by light sources which are remote from the camera.

Each particular area to be lighted will dictate the type and intensity of light that will be needed. In some situations direct light from the light source without any alteration may be required. In other situations direct light may be too strong or cast overly distinct shadows in which case a more diffused light will be more desirable. In still other cases an even more indirect diffused light may be needed to create the proper lighting effect. It is also desirable to have a light diffuser that is a compact, self-contained unit that is easy to position and use.

SUMMARY OF THE INVENTION

The present invention relates to a light modifier for use in conjunction with a continuous light source to provide various types of diffused light for imagemakers.

This rugged lamp assembly or light head of this invention accommodates either five Tungsten Halogen or five Fluorescent lamps with a standard base. With one light head, you can light for daylight with the lower amperage, cooler temperature fluorescent lamps or use the higher light output Tungsten Halogen lamps. By switching lamps, you can quickly change not only the color temperature, but the environmental temperature as well.

Three separate control switches in this innovative design allow you to light multiple combinations of lamps together to control light output. When using two or more lamps on one set, the control switches allow you flexibility in controlling lighting ratios.

The light modifier assembly is an economical light source that is ideal for any imagemaker or studio shooting with film or digital equipment. The assembly, when using the fluorescent lamps, offers cool continuous light that can be placed close to the subject for maximum efficiency. The assembly contains multiple lamps mounted together in a single lamp housing and placed in an intensifier to produce a constant and efficient light source. A removable front diffuser may be used to soften the light.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT(S)

The assembly of this invention is an economical light source that is ideal for any imagemaker or studio shooting with film or digital equipment. The assembly, when using the fluorescent lamps, offers cool continuous light that can be placed close to the subject for maximum efficiency. The assembly contains multiple lamps mounted together in a single lamp housing and placed in an intensifier to produce a constant and efficient light source.

The lamps of this invention may be an MSR (medium surface rare earth) lamp, an HMI lamp, a tungsten halogen lamp, or a fluorescent lamp.

Figure 1:
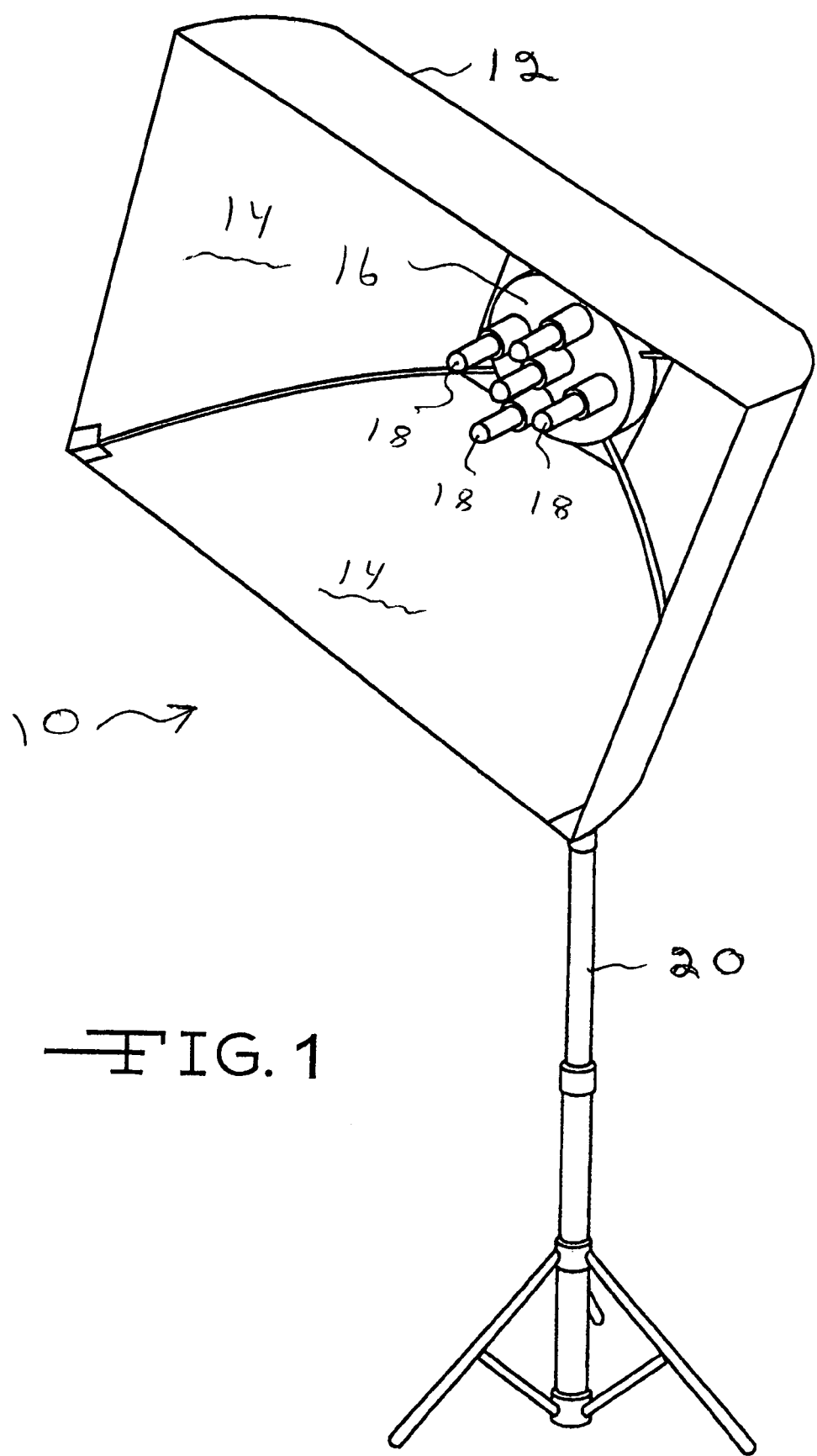
FIG. 1 is a perspective side view of a lamp housing and lamp assembly mounted on a floor stand according to the present invention.

FIG. 1 is a perspective side view of a lamp housing and lamp assembly mounted on a floor stand according to the present invention. FIG. 1 shows a light modifier assembly 10 comprising lamp housing 12 forming a substantially parabolic structure defining an opening wherein the housing has reflective interior surface 14 configured to gather light and reflect the light towards the opening; and light source 16 disposed on the interior surface of the lamp housing away from the opening wherein light source 16 comprises multiplicity of lamps 18. Assembly 10 is mounted to floor stand 20.

Figure 2:
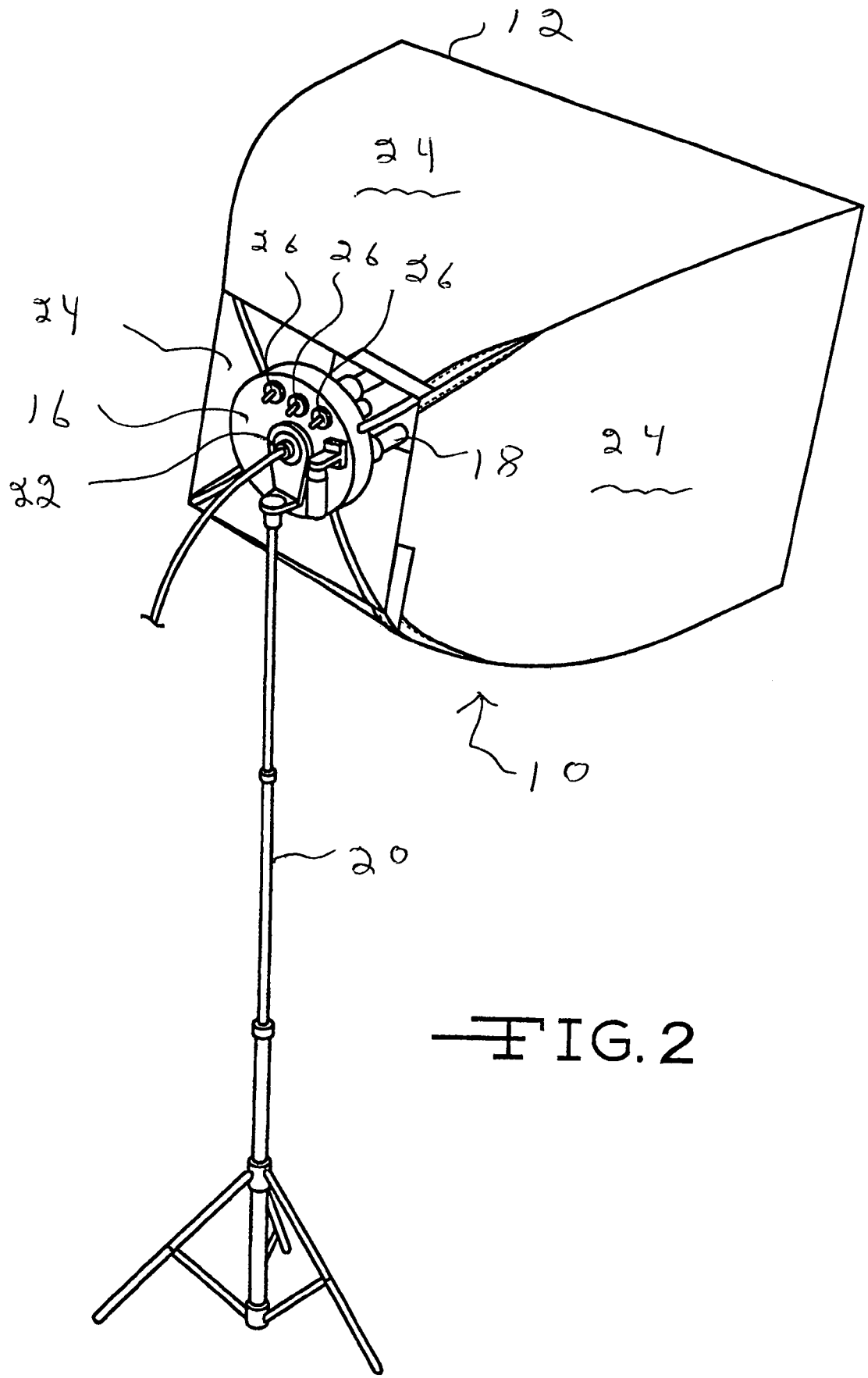
FIG. 2 is a rear view of the lamp housing and lamp assembly mounted on a floor stand according to the present invention.

FIG. 2 is a rear view of lamp housing 12 and light source 16 mounted on floor stand 20 according to the present invention. FIG. 12 shows mounting assembly 22 rotatably mounted to exterior surface 24 of lamp housing 12 away from the opening; and control 26 operatively connected to light source 16 and configured to run multiple combinations of lamps 18 together with no shift in color temperature and to set up multiple lighting ratios.

Figure 3:
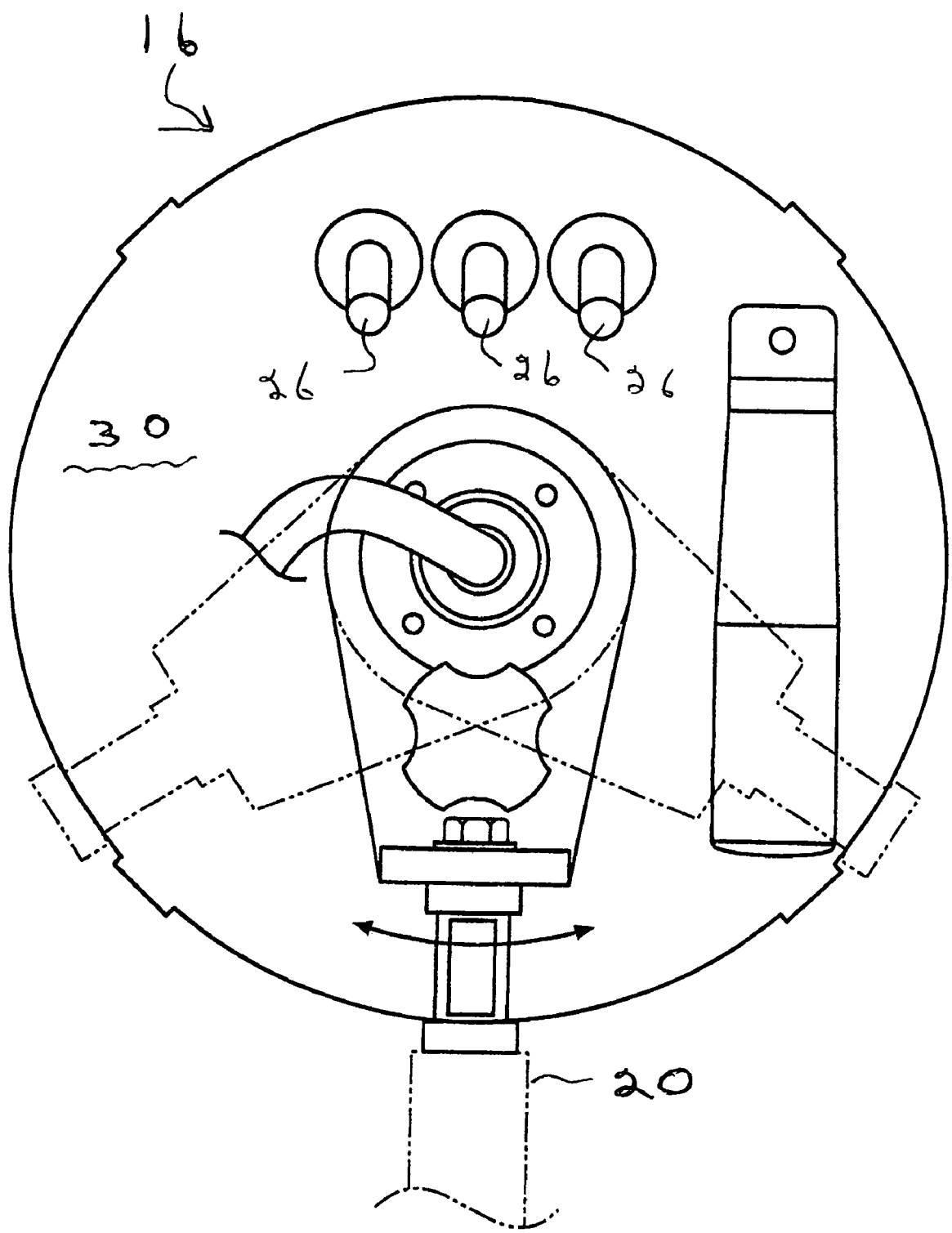
FIG. 3 is a fragmentary back view of the light assembly according to the present invention.

FIG. 3 is a fragmentary back view of assembly 10 according to the present invention. Control 26 is mounted on exterior surface 30 of light source 16 away from the opening. In a preferred embodiment, control 26 has three or more separate controls.

Figure 4:
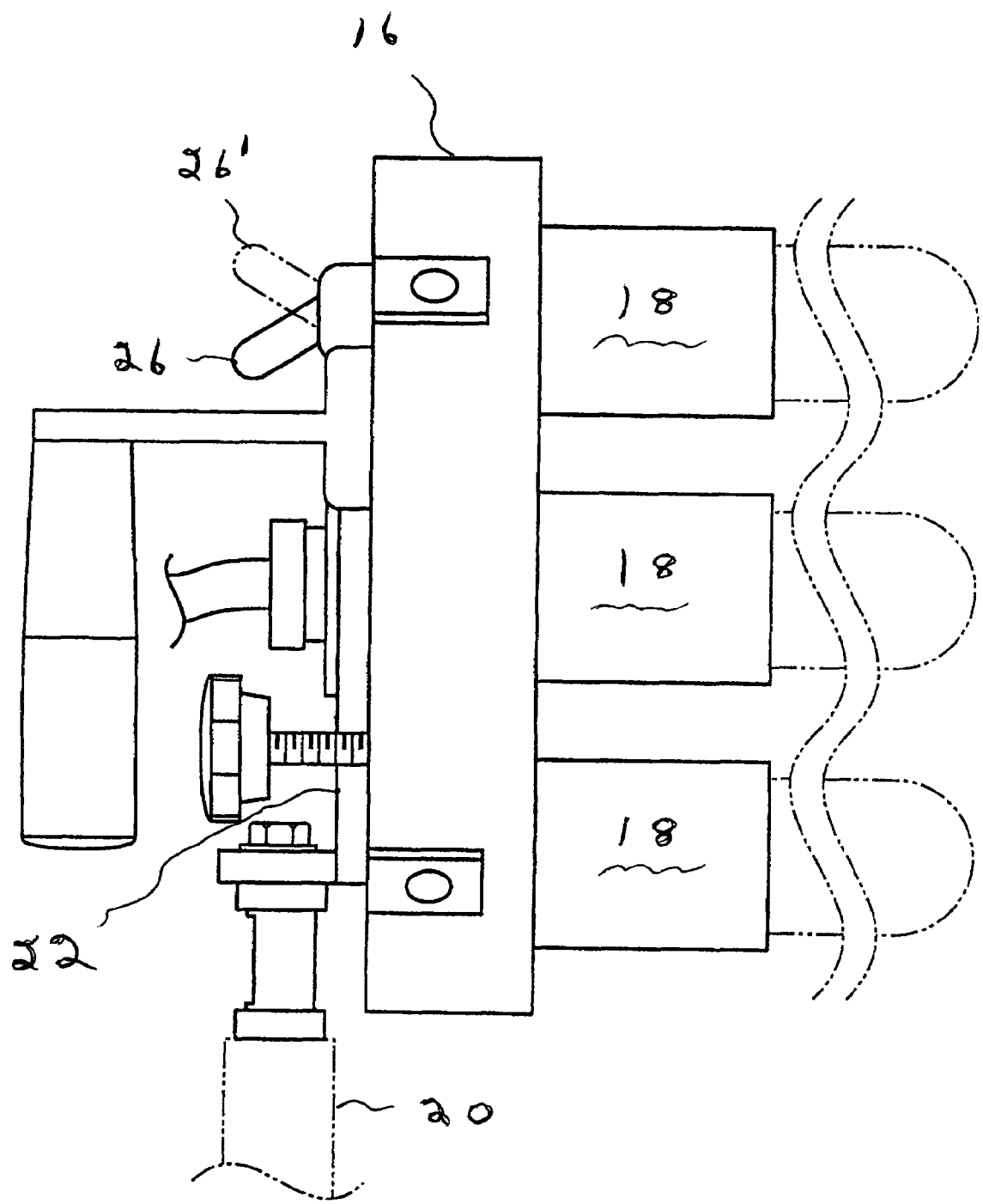
FIG. 4 is a fragmentary back view of the light assembly according to the present invention.

FIG. 4 is a fragmentary side view of light source 16 according to the present invention. Control 26 is shown in an off position. The on position for control 26 is shown in phantom.
}

Figure 5:
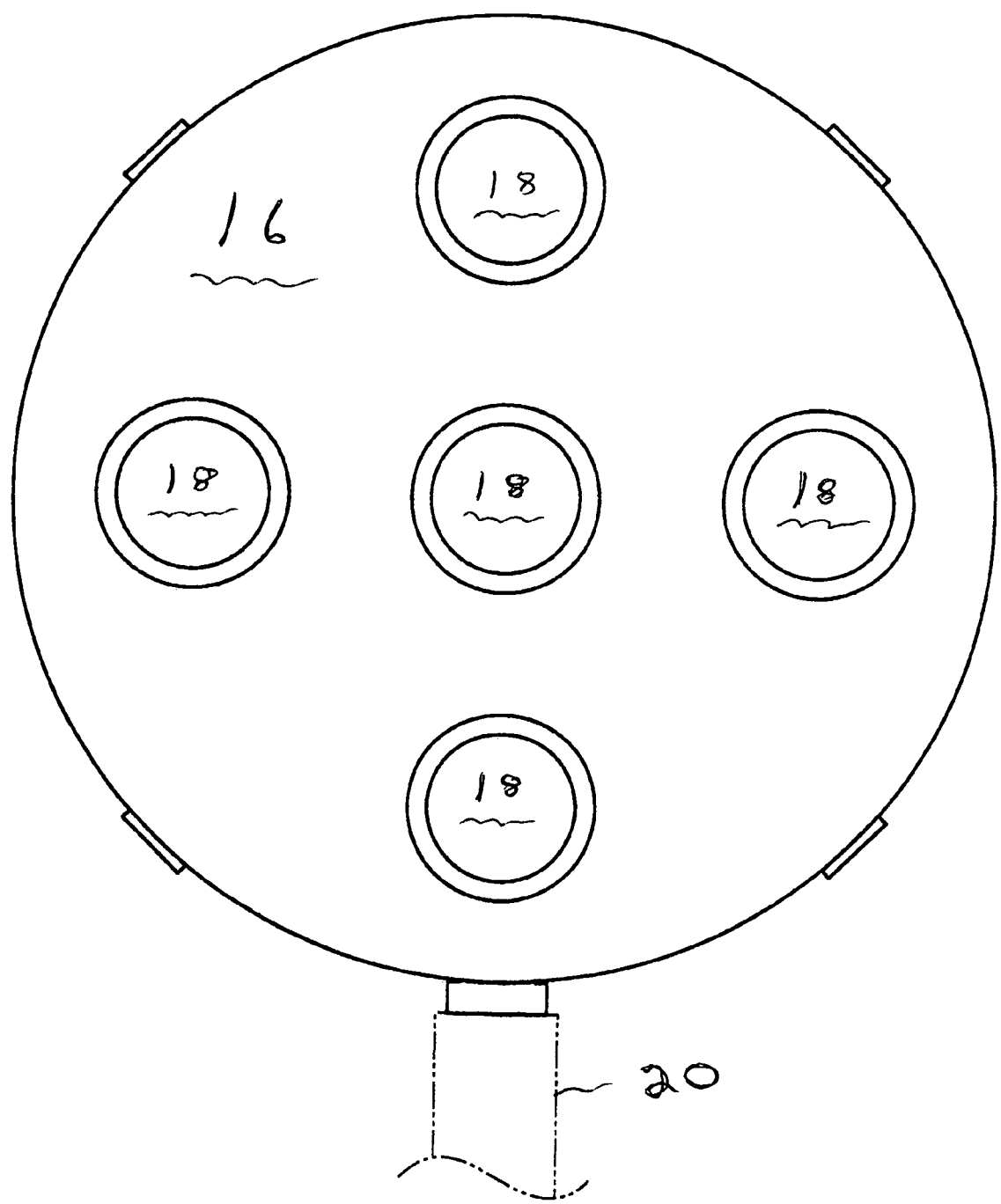
FIG. 5 is a fragmentary front view of the lamp assembly according to the present invention.

FIG. 5 is a fragmentary front view of light source 16 according to the present invention. Shown is a multiplicity of lamps 18.

Figure 6:
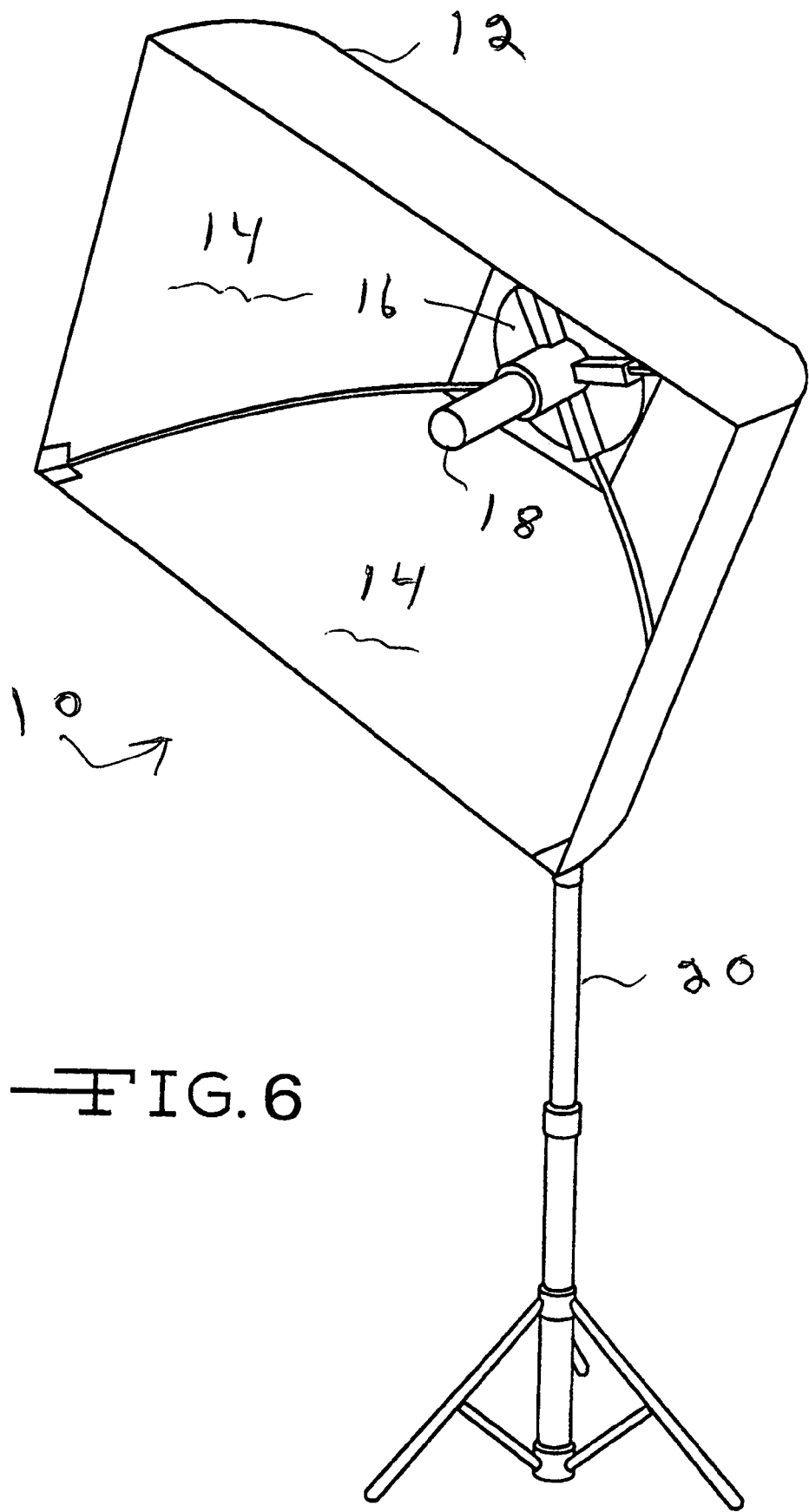
FIG. 6 is a perspective side view of FIG. 1 showing another embodiment of the light source wherein the lamp assembly includes only one lamp.

FIG. 6 is a perspective side view of FIG. 1 showing another embodiment of the light source wherein the lamp assembly includes only one lamp. Lamp 18 is shown. When a single lamp 18 is employed, the preferred embodiment is a fluorescent lamp.

Figure 7:
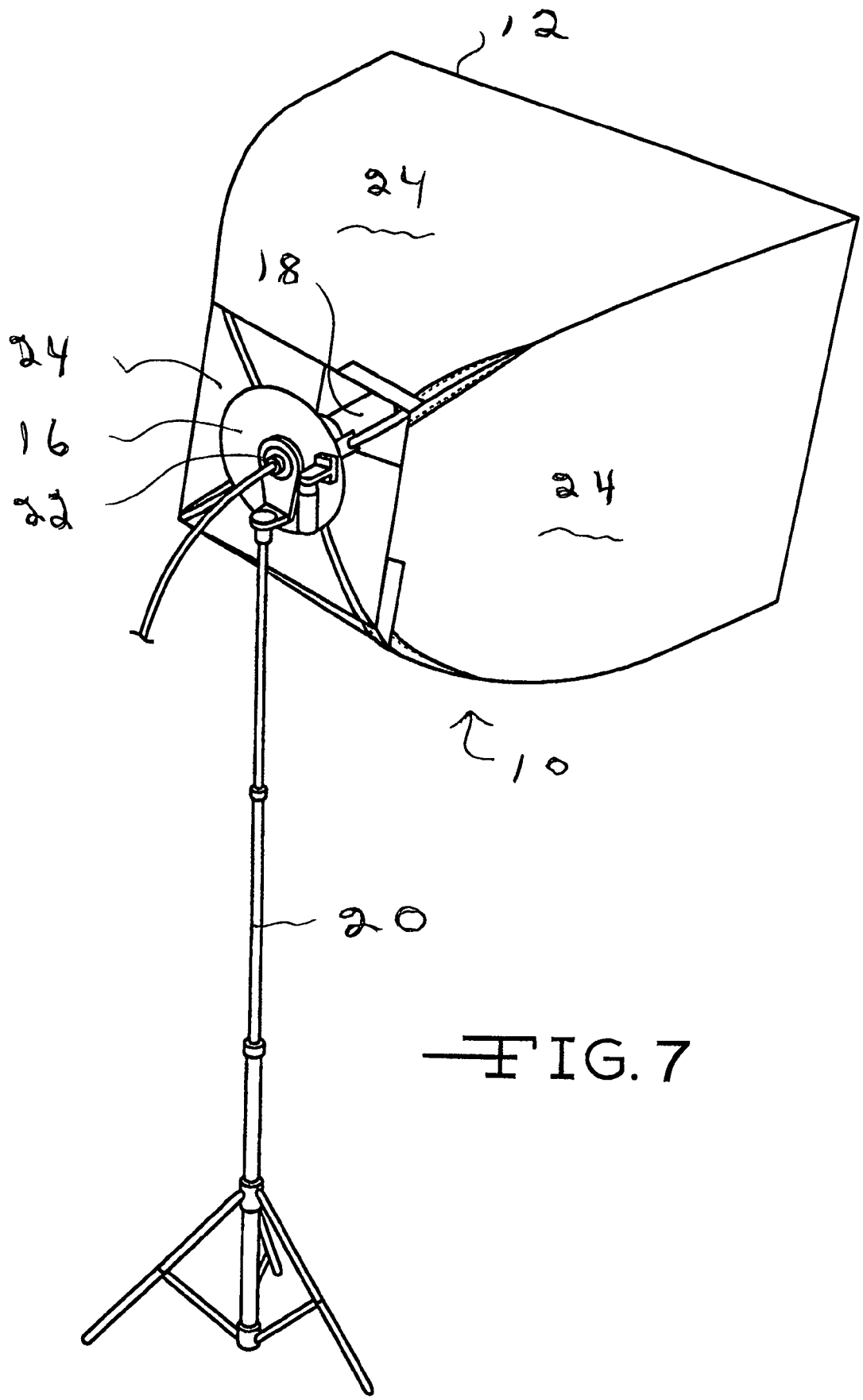
FIG. 7 is a rear view of the assembly of FIG. 6.

FIG. 7 is a rear view of the diffuser and assembly of FIG. 6. In this embodiment, no control 26 is shown.

Figure 8:
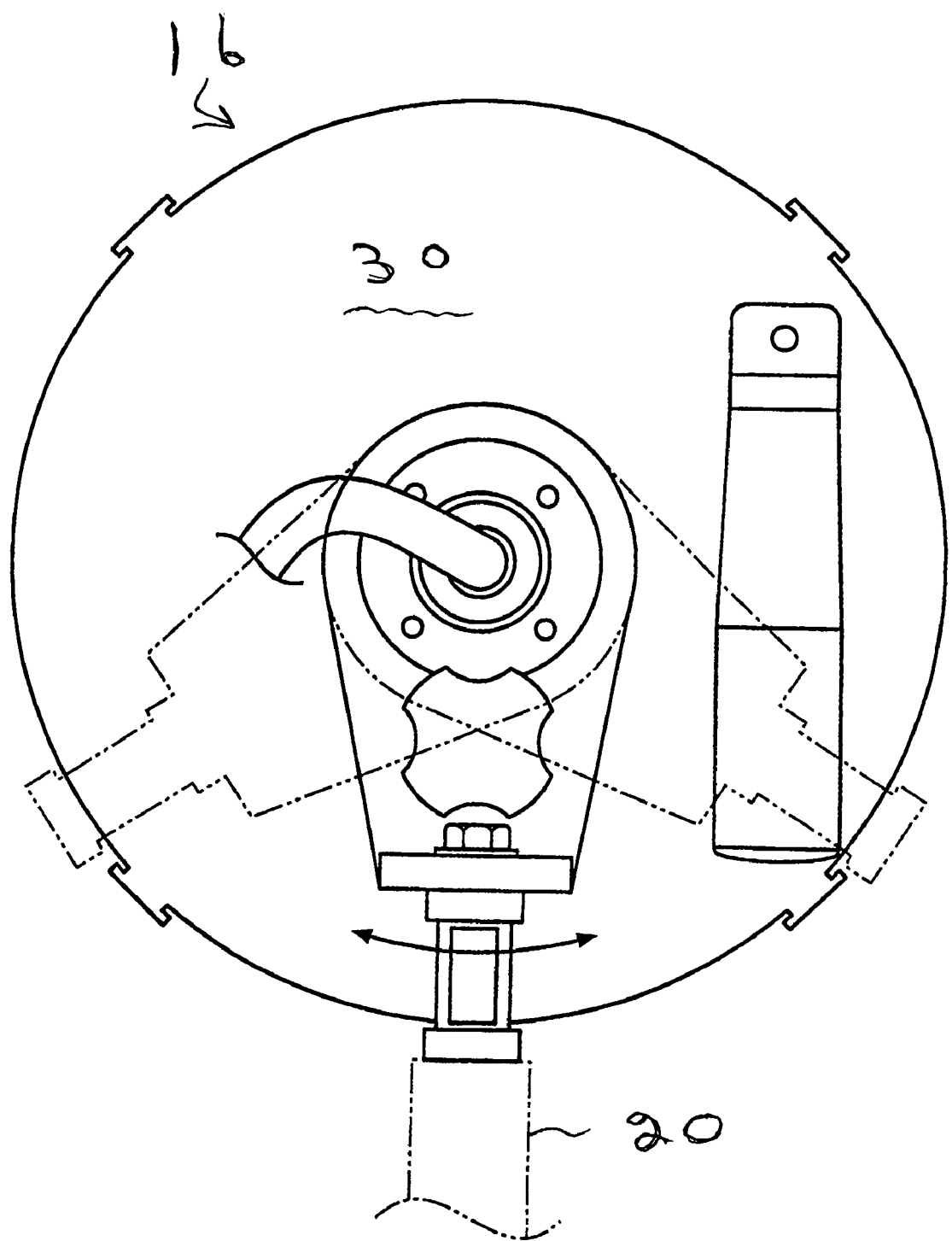
FIG. 8 is a fragmentary back view of the assembly of FIG. 7.

FIG. 8 is a fragmentary back view of the light diffuser of FIG. 7.

Figure 9:
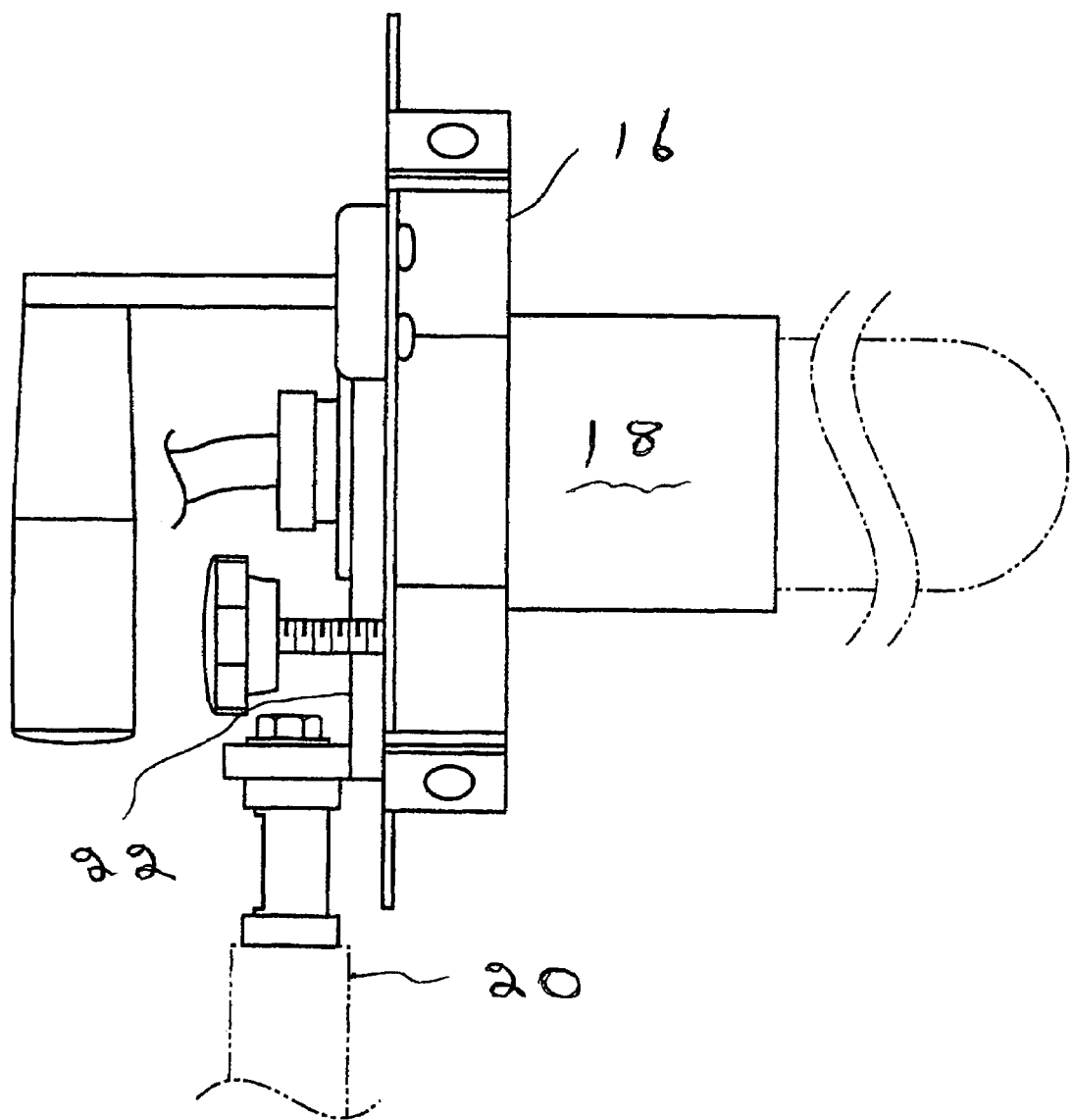
FIG. 9 is a fragmentary side view of the assembly of FIG. 8.

FIG. 9 is a fragmentary side view of the light diffuser of FIG. 8.

Figure 10:
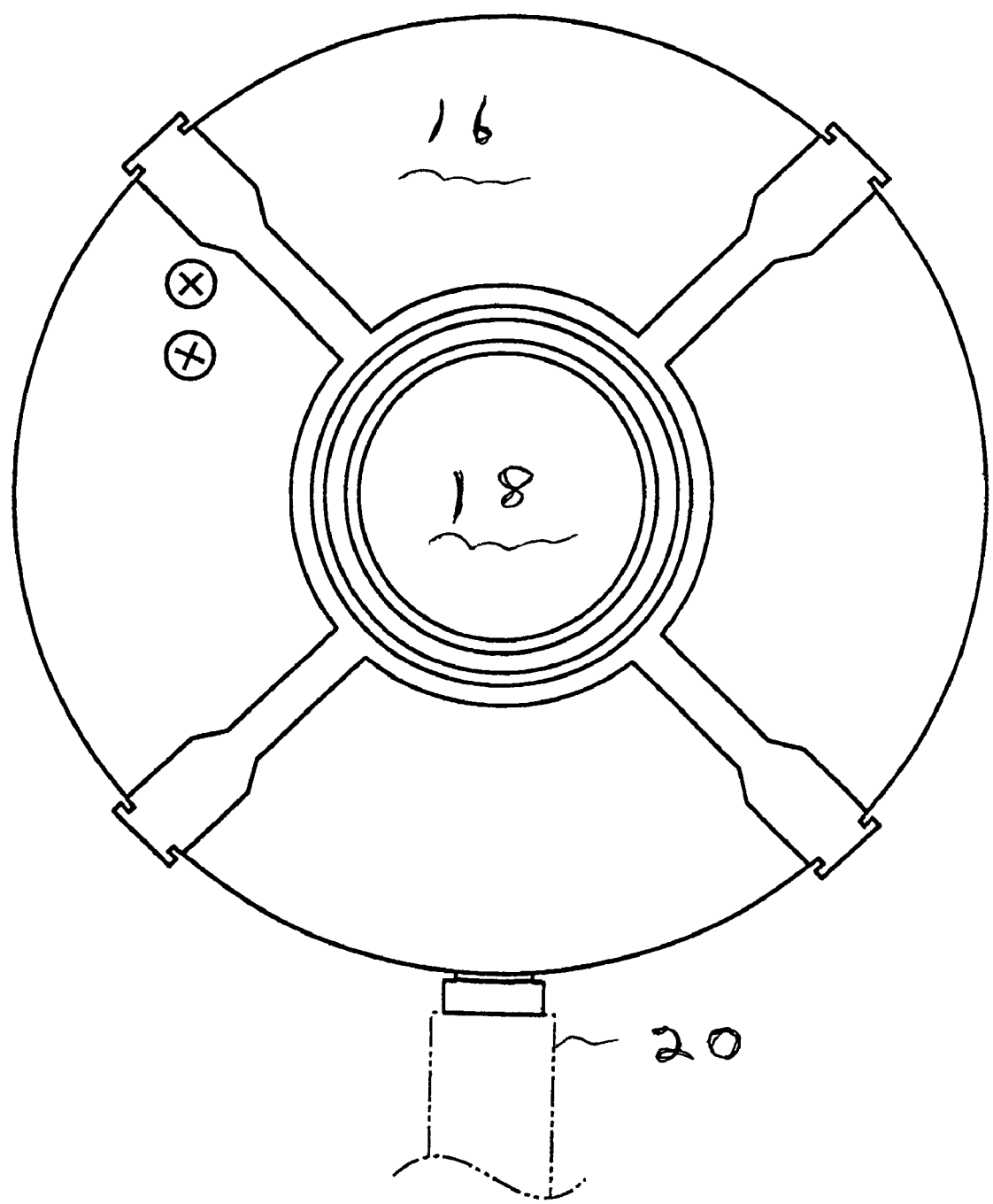
FIG. 10 is a fragmentary front view of the embodiment of FIG. 6.

FIG. 10 is a fragmentary front view of the embodiment of FIG. 6.

EXAMPLE

The preferred assembly of this invention comprises the ability for use with MSR (medium surface rare earth) lamps, HMI lamps, tungsten halogen lamps, or fluorescent lamps. The lamps have the ability to quickly change not only color temperature, but also environmental temperature. Three or more separate controls allow running multiple combinations of lamps together with no shift in color temperature. These separate controls allow setting up light ratios when using multiple lamp heads on one set. The lamp housing is all metal construction. The housing includes built-in points for direct attachment of a soft box. No adapter ring is needed. A handle is attached for quick softbox rotation.

While certain embodiments of the invention have been described for purposes of illustration, it is to be understood that there may be various embodiments and modifications within the general scope of the invention.

We claim:

1. A light modifier assembly comprising:
   a lamp housing forming a substantially parabolic structure defining an opening wherein the housing has a reflective interior surface configured to gather light and reflect the light towards the opening;
   a light source disposed in the interior of the lamp housing away from the opening wherein the light source comprises a multiplicity of lamps,
   a mounting assembly rotatably mounted to an exterior surface of the lamp housing away from the opening; and
   a control operatively connected to the light source and configured to run multiple combinations of lamps together with no shift in color temperature and to set up multiple lighting ratios.

2. An assembly according to claim 1 wherein the control is mounted on the exterior surface of the lamp housing away from the opening.

3. An assembly according to claim 1 wherein the control has three or more separate controls.

4. An assembly according to claim 1 wherein the lamps are a MSR (medium surface rare earth) lamp, an HMI lamp, a tungsten halogen lamp, or a fluorescent lamp.

5. An assembly according to claim 1 wherein the lamps are halogen or fluorescent lamps.

6. An assembly according to claim 1 wherein the lamps are halogen lamps.

7. An assembly according to claim 1 wherein the lamp housing is made of metal.

8. An assembly according to claim 1 wherein the lamp housing includes a soft-box structure.

9. An assembly according to claim 1 including a stand attached to the mounting assembly.

10. An assembly according to claim 9 wherein the multiplicity of lamp are fluorescent lamps.

11. An assembly according to claim 1 wherein the control is more than one on/off switch connected to various combinations of the multiplicity of lamps in the light source.

12. A light modifier assembly comprising:
    a lamp housing forming a substantially parabolic structure defining an opening wherein the housing has a reflective interior surface configured to gather light and reflect the light towards the opening;
    a light source disposed in the interior of the lamp housing away from the opening wherein the light source comprises a multiplicity of halogen lamps,
    a mounting assembly rotatably mounted to an exterior surface of the lamp housing away from the opening; and
    a control operatively connected to the light source and configured to run multiple combinations of lamps together with no shift in color temperature and to set up multiple lighting ratios, wherein the control is three separate controls.

* * * * *